United States Patent [19]

Gwinn et al.

[11] Patent Number: 5,351,930

[45] Date of Patent: Oct. 4, 1994

[54] MOUNTING FOR ENGINES AND THE LIKE

[75] Inventors: John J. Gwinn; Warren E. Schmidt, both of Erie, Pa.; Marshall W. Downing, Chambourcy, France

[73] Assignee: Lord Corporation, Erie, Pa.

[21] Appl. No.: 928,925

[22] Filed: Aug. 11, 1992

[51] Int. Cl.⁵ .............................. B64D 27/26
[52] U.S. Cl. ...................... 248/557; 244/54; 248/638
[58] Field of Search ............... 248/554, 557, 637, 638; 244/54, 53 R

[56] References Cited

U.S. PATENT DOCUMENTS

| | | | |
|---|---|---|---|
| 3,085,773 | 4/1963 | Anstrom et al. | 248/5 |
| 3,487,888 | 1/1970 | Adams et al. | 181/33 |
| 3,727,862 | 4/1973 | Kaufhold et al. | 244/54 |
| 3,809,340 | 5/1974 | Dolgy et al. | 244/54 |
| 3,907,220 | 9/1975 | Amelio | 244/54 |
| 4,441,313 | 4/1984 | Joubert et al. | 60/262 |
| 4,494,738 | 1/1985 | Britton et al. | 267/140 |
| 4,500,054 | 2/1985 | Osborn | 244/54 |
| 4,571,936 | 2/1986 | Nash et al. | 60/39.31 |
| 4,603,822 | 8/1986 | Chee | 248/554 |
| 4,634,081 | 1/1987 | Chee | 244/54 |
| 4,717,094 | 1/1988 | Chee | 244/54 |
| 4,725,019 | 2/1988 | White | 244/54 |
| 4,742,975 | 5/1988 | Pachomoff et al. | 244/54 |
| 4,805,851 | 2/1989 | Herbst | 244/54 |
| 4,821,980 | 4/1989 | Clausen et al. | 244/54 |
| 4,854,525 | 8/1989 | Chee | 244/54 |
| 4,875,655 | 10/1989 | Bender et al. | 248/557 |
| 4,943,013 | 7/1990 | Kapala et al. | 244/54 |
| 5,005,326 | 4/1991 | Ishimaru et al. | 52/167 R |
| 5,108,045 | 4/1992 | Law et al. | 244/54 |
| 5,176,339 | 1/1993 | Schmidt | 244/54 |

Primary Examiner—Richard K. Seidel
Assistant Examiner—Hwei-siu Payer
Attorney, Agent, or Firm—Randall S. Wayland; Richard K. Thomson

[57] ABSTRACT

A mounting (20) which provides low vertical and lateral spring rates for excellent lateral and vertical vibration isolation yet provides a high roll stiffness for reacting torsional moments, while reducing isolator complexity and eliminating the need for a yoke or hanger. The mounting (20) includes a top member (34), a first arm (26) and a second arm (28) which are flexibly interleaved or attached. The first arm (26) is attached to a top member (34) by way of a pivot which can be a spring (30), the second arm (28) is also attached to the top member (34) by another pivot which can be a spring (32), and a third spring (36) attaches the arms (26) and (28) to each other. The arms (26) and (28) also attach to the supported member (22) preferably at their respective outboard ends (38), or at least one intermediate link can be used. The arms (26) and (28) are stiffly interconnected to one another, yet flexibly connected to a top member (34), such that relative vertical movement between the arms (26) and (28) is restricted. Thus a high roll stiffness is provided, yet allowing movement of the arms (26) and (28) as a unit for providing vertical and lateral isolation. One embodiment of the mounting (20) improves further over the related mountings by localizing the lateral elastic center of the mounting (20) towards the center of gravity (CG) of the supported member (22) such that side loads applied to the supported member (22) result in lateral translation and limited rotation of the (CG) of supported member (22).

20 Claims, 12 Drawing Sheets

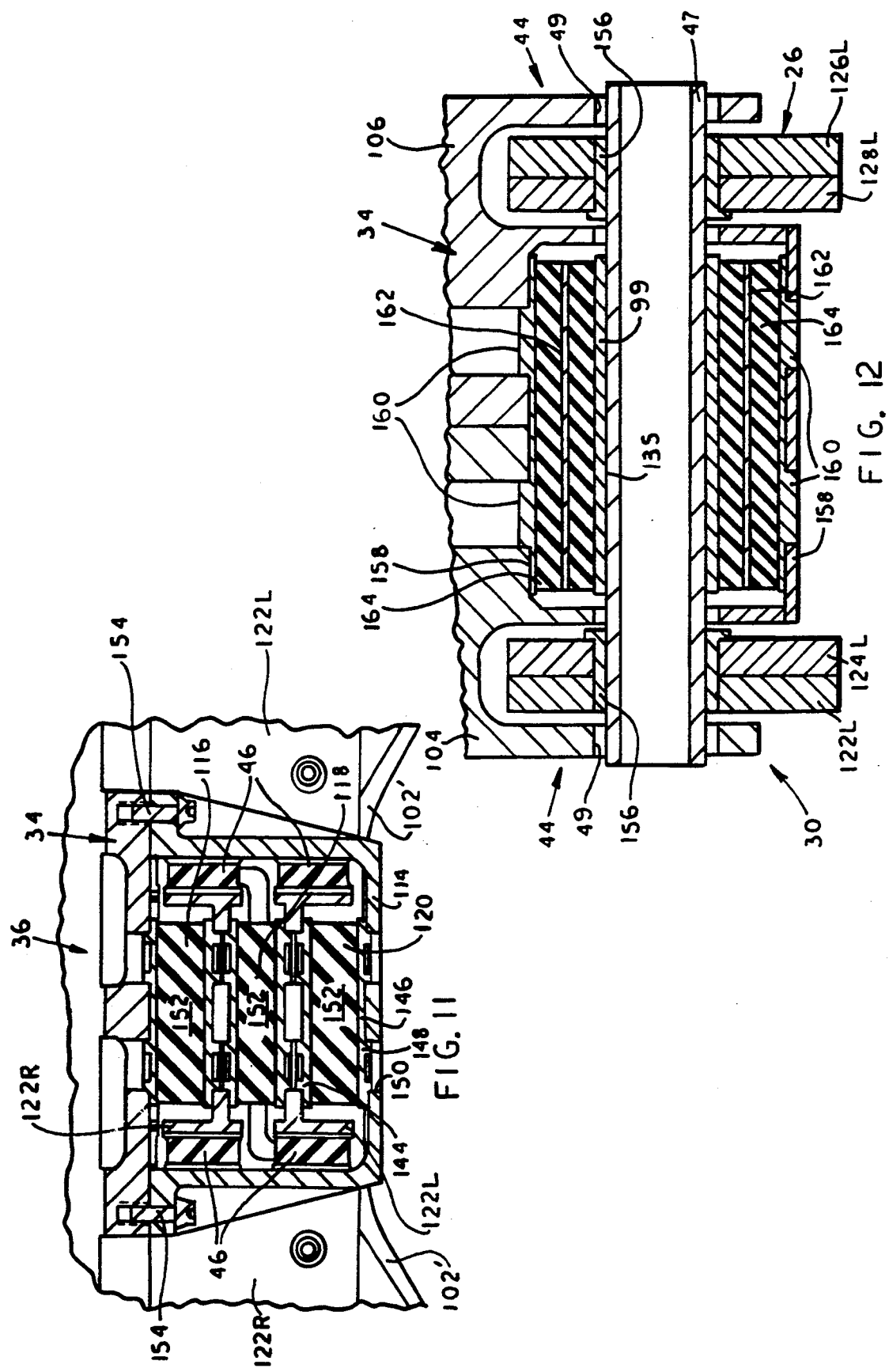

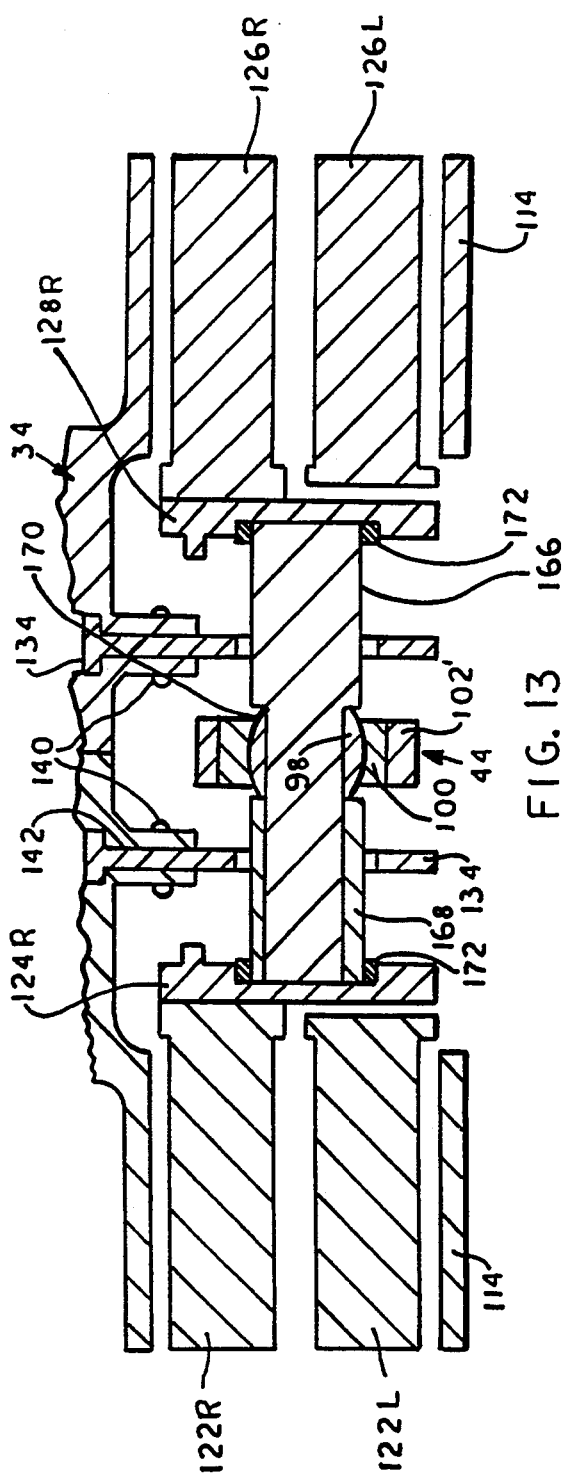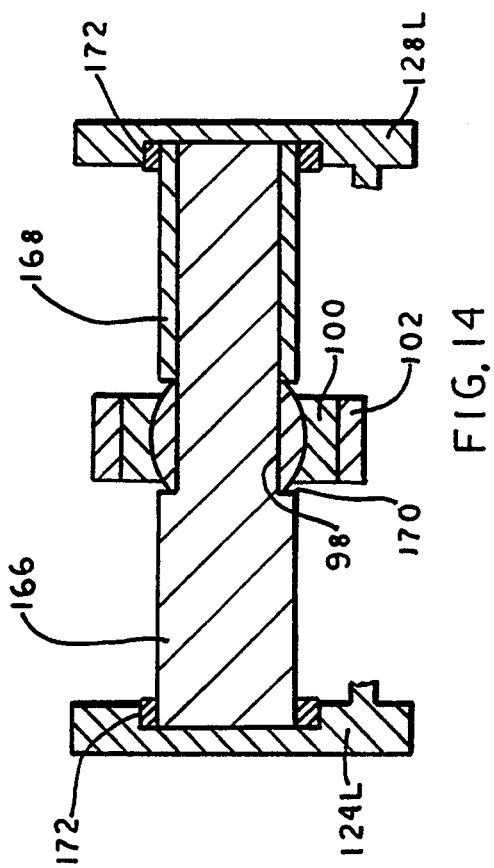

MOUNTING FOR ENGINES AND THE LIKE

FIELD OF THE INVENTION

This invention relates to the area of mountings for attaching a supported member to a supporting member. Specifically, the invention relates to the area of flexible mountings for providing vibration isolation and support for a supported member which requires a high degree of roll restraint about a longitudinal axis.

BACKGROUND OF THE INVENTION

Flexible mountings for attachment between a supporting member and a supported member, which exhibit a high degree of roll restraint of the supported member, yet still isolate the supporting member from vibration, are desirable in some applications. A high roll stiffness comes into play when one side of the mounting at the attachment to the supported member is loaded upwardly while the other is loaded downwardly. Vertical loading of the mounting occurs when the supporting member and the attachment points to the mounting on both sides of the supported member move up or down together. A high degree of roll restraint is particularly useful to eliminate large lateral excursions or motions of the supported member when subjected to torsional moments due to side loads applied to the supported member below the mounting. This is particularly true in aircraft engine applications, where exceeding a lateral sway space envelope requirement will cause interference between the engine and the engine cowl, or between the engine and other structural components. In general, the mounting attributes which produce high roll stiffness do not result in low translational stiffness which is desirable for vibration isolation, i.e., they impose contrary requirements.

One such high roll stiffness mounting is described in U.S. Pat. No. 4,634,081 to Chee, wherein an aft engine mount with vibration isolators is described for suspending an aircraft engine core 10 below an engine mounting strut 12. The mounting includes a yoke 16 which is affixed to the ears 18 and 20, which are formed on the mounting ring of the engine. At least one mounting link 24 is used for accommodating radial engine expansion due to temperature. Spaced-apart isolator assemblies are captivated by isolator housings 32 such that engine weight is supported. In addition, this spacing of the isolator assemblies provides for a relatively high roll stiffness. The tubeform-type isolator assemblies provide effectively soft lateral stiffnesses for lateral vibration isolation. However, due to limited space, or envelope, available for locating the tubeform-type isolator assemblies far apart, the vertical stiffness of each of the isolator assemblies must be very high to obtain adequate roll stiffness, and to control motions of the supported member due to side loads. A high vertical stiffness will limit the level of isolation achievable in the vertical and pitch modes of the system. Also, it should be emphasized that this type of mounting includes at least one link to accommodate radial engine expansion and an expensive yoke attachment between the mounting and the supported member, thus requiring a large space envelope.

The commonly assigned U.S. Pat. No. 4,805,851 to Herbst, which is hereby incorporated by reference, provides a solution to the problem of how to get soft vertical and lateral stiffnesses for adequate vibration isolation, yet provide a very high roll stiffness for control of lateral engine loads. This was accomplished by providing an aft engine mounting bracket assembly 12 comprising a base 13, a torque tube shaft 22 with arms 20 and 21 extending from the ends of the torque tube 22. Further, the mounting assembly 12 included a cap 48 for attaching an elastomeric bearing 26 to the base 13. The elastomeric bearing 26 is very stiff vertically and provides a high degree of roll stiffness when arms 20 and 21 are loaded vertically in opposite directions. Spacing the engine attachment points forward of the elastomeric bearings 26 on the arms 20 and 21 makes them act as levers. Therefore, when both arms move together, the effective vertical stiffness at the engine is sufficiently low to provide superior isolation. At the same time, roll moments which occur when the arms are loaded in opposite directions, are restrained by the extremely rigid torque tube shaft 22. Again, like the Chee U.S. Pat. No. '081 mounting, this isolator assembly requires a yoke or hanger for attachment to the arms 20 and 21, and at least one link to accommodate the radial engine expansion due to thermal effects. Also, it should be noted, because of the high profile of the mount and yoke, this configuration requires a significant vertical space envelope between the supporting member and the supported member.

The commonly assigned U.S. Pat. No. 5,108,045 to Law et al. entitled "Engine Mounting Assembly", which is hereby incorporated by reference, describes an engine mounting which improves over the Herbst U.S. Pat. No. '851 concept by providing elastomer sections which are effectively loaded in pure shear or pure compression, thus leading to enhanced service life and linearity. Although the performance of this mounting is superior, it like the Herbst U.S. Pat. No. '851 and Chee U.S. Pat. No. '081 mounting concepts requires a hanger or yoke to transfer loads into the engine mount. It also requires at least one link to accommodate the radial engine expansion. In addition, like the Herbst U.S. Pat. No. '851 mounting, the height of the mount and yoke will require a significant amount of space between the supporting member and the supported member. It should be emphasized that all the abovementioned mountings have lateral elastic centers which are far above the center of gravity (CG) of the supported member. Thus, applied side loads will cause a high degree of rotation of the supported member about this elastic center, imparting a high degree of lateral motion of the CG.

SUMMARY OF THE INVENTION

In light of the advantages and shortcomings of the related art, it is therefore a primary objective to provide an isolator assembly which provides superior lateral and vertical isolation while providing a very high roll stiffness, yet reduces the isolater complexity by eliminating the need for a separate yoke or hanger for interconnection to the supported member.

Another objective is to provide a flexible mounting which provides a high degree of roll restraint and exhibits a low-profile when compared to the related mountings.

Another objective is to provide a mounting which provides high roll restraint and which is also localized to project its lateral elastic center toward the center of gravity (CO) of the supported member, such that lateral movement of the supported member's CG is minimized.

It is another objective to provide a mounting which is fail-safe, such that the loss of any one of the connecting components of the supported member results in a safe mode, whereby the supported member is supported through a structurally-sound, secondary load path.

In summary, it is a feature of the instant invention to satisfy the abovementioned objects by providing a mounting for connecting a supported member to a supporting member, comprising a first arm, a second arm, a first pivot attached to the first arm and adapted to react loads into said supporting member, a second pivot attached to the second arm and adapted to react loads into the supporting member, and spring means attached between said first and second arms for restricting relative vertical motion between the first and second arms.

It is an advantage of the present invention that a low vertical profile is provided by the mounting.

It is an advantage of the present invention that a high roll stiffness capability is achievable with the mounting.

It is an advantage that an embodiment of the present invention can have the lateral elastic center focalized toward the CG of the supported member such that less torsional rotation will occur when a lateral load is applied at the CG.

It is an advantage of an embodiment of the mounting of the present invention that fail-safe features are provided wherein the loss of any one of the interconnecting components results in the load being carried by another one or more of the remaining components.

The abovementioned and further objects, features and advantages of the present invention will become apparent from the accompanying descriptions of the preferred embodiments and attached drawings.

BRIEF DESCRIPTION OF THE DRAWINGS

The accompanying drawings, which form a part of the specification, illustrate several embodiments of the present invention. The drawings and description together serve to fully explain the invention. In the drawings.

FIG. 11 is a partially-sectioned and enlarged-breakout view along line 11—11 of FIG. 8 of the mounting showing the third spring;

FIG. 12 is a partially-sectioned enlarged partial view along line 12—12 of FIG. 9 of the mounting showing a portion of the first spring;

FIG. 13 is a partially-sectioned enlarged view along line 13—13 of FIG. 10 of a portion of the mounting showing the attachment of the links; and FIG. 14 is a partially-sectioned enlarged isometric view along line 14—14 of FIG. 10 of the mounting showing the attachment of links to ends of the arms.

DETAILED DESCRIPTION OF THE INVENTION

Figure 1:
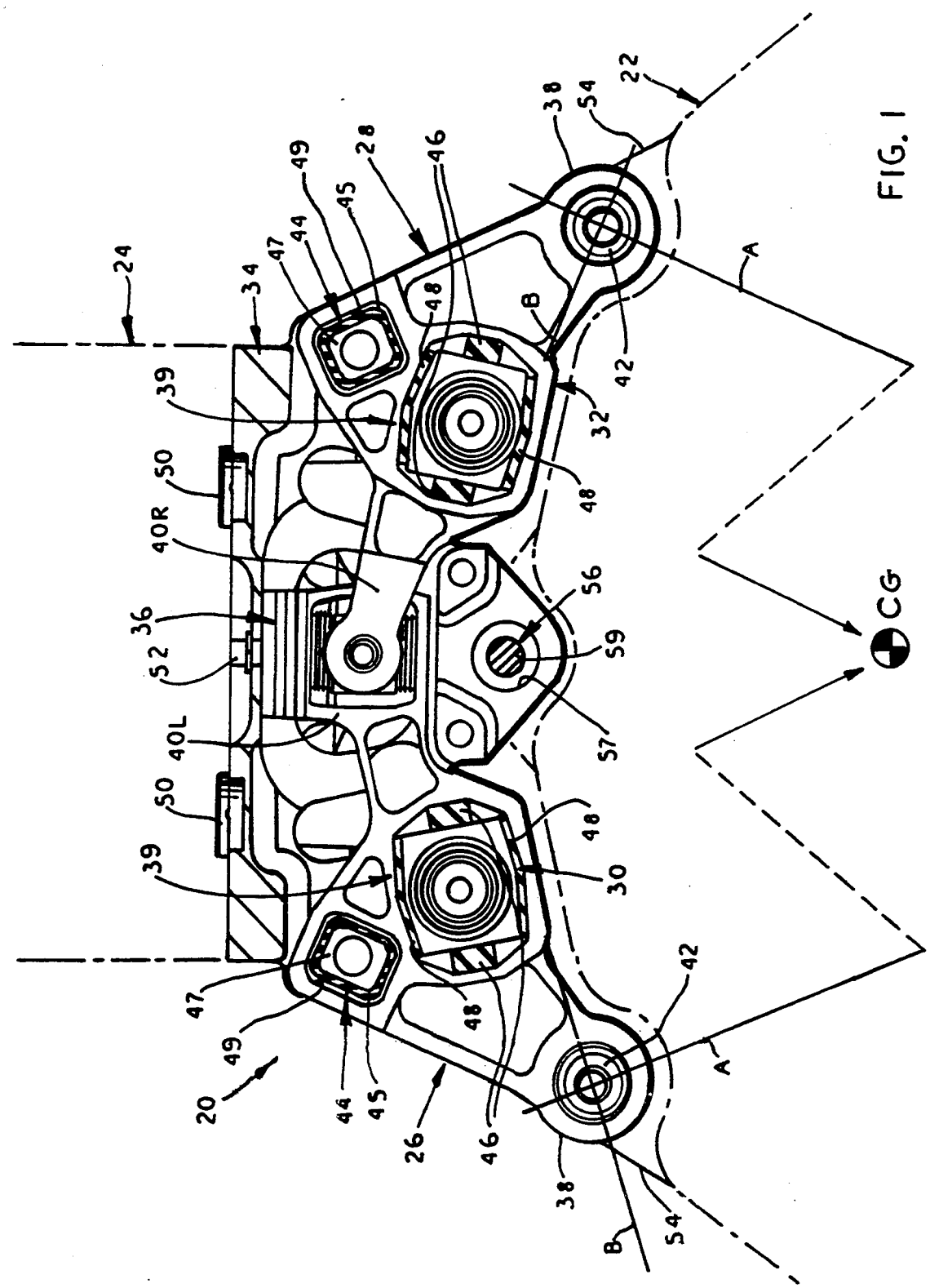
FIG. 1 is a partially-sectioned, forward-looking view of the mounting illustrating an embodiment for attachment between a supported member and a supporting member.

An embodiment of the mounting is shown in FIG. 1, generally at 20. The mounting 20 is shown flexibly connecting or attaching a supported member 22 (shown in dotted lines), such as an aircraft engine or auxiliary power unit (APU) to a supporting member 24 (shown in dotted lines), such as an aircraft pylon, strut, or structure. The mounting 20, however, can be used to support any member which requires a high degree of roll restraint to limit motions due to lateral loads at the center of gravity (CG). This embodiment of mounting 20 has the further advantage of not requiring a yoke or hanger for attaching to the supported member, thus providing a less complex and lower profile mounting. The mounting 20 includes a first arm 26, a second arm 28, and a first spring 30 flexibly connecting or attaching the first arm 26 to a top member 34. The top member 34 is attached to the supporting member 24, thus forming an interconnection such that loads applied at the supported member 22 can be reacted into the supporting member 24. Also included in the mounting 20 is a second spring 32 flexibly connecting or attaching the second arm 28 to the top member 34 and also forming an interconnection such that loads can be reacted by the supporting member 24. A third spring 36 interconnects the first arm 26 to second arm 28 or interleaves arms 26 and 28 with each other such that relative vertical motion between the arms is restricted at the point of interconnection. In this embodiment, the third spring 36 also connects one of the first and second arms 26 and 28 to the top member 34, causing an interconnection to the supporting member 24, such that loads can be reacted.

These interconnections form the key to the present mounting 20: by virtue of third spring 36, the mounting 20 exhibits a high degree of roll restraint and, yet, exhibits low vertical and lateral stiffness. This leads to enhanced vibration isolation in the lateral and vertical directions and, in addition, the assembly profile height and the complexity (number of components needed) of the mounting 20 is reduced as compared to other mountings. Further, this embodiment of the present invention provides the opportunity to focalize the lateral elastic center of the mounting towards the CG of the supported member, such that rotation under side loads will be minimized. In essence, if the lateral elastic center of the mounting 20 coincides with the CG location of the supported member 22, lateral loads will cause effectively pure translation and little rotation.

Each arm 26 and 28 includes an outboard end 38, an inboard end 40L, 40R and a central portion 39 extending intermediate between them. The outboard end 38 is preferably adapted for attachment to the supported member 22; in this case, a ball joint is used for attachment. The central portion 39 is preferably attached to the first spring 30 which acts as means for allowing pivoting of arm 26 relative to top member 34. The first spring 30 also reacts loads into the top member 34, and ultimately into the supporting member 24. Likewise, the second spring 32 reacts loads incurred by the second arm 28 into the top member 34, in a similar manner.

The means for allowing pivoting of each arm 26 and 28 relative to said top member 34 are preferably located at a central portion 39 of said arms 26 and 28. The means for allowing pivoting includes an axis on each arm 26 and 28 about which the arms 26 and 28 pivot relative to said top member 34 as a result of vertical and lateral loads. These two pivot axes of arms 26 and 28 are non-coincident, separate, and distinct axes, such that each arm 26 and 28 pivots about a separate axis. In essence, the axes, and thus, the means for allowing pivoting are spaced apart and non-coincident. The first pivot axis is located at or near the central portion 39 of said first arm 26 and the second pivot axis is located at or near the central portion 29 of said second arm 28. On the first arm 26, the inboard end 40L is a box-shaped member, whereas the inboard end 40R of second arm 28 is a clevis arrangement. A more detailed description of this interconnecting third spring 36 is given later. The first arm 26 and, similarly, the second arm 28, each include a pivot 42, such as a spherical ball joint at the outboard end 38 of first and second arms 26 and 28 for allowing pivoting about any axis near the outboard ends 38. This pivoting, for example, could be due to temperature expansion along the length of the supported member 22. Further, the pivoting can occur due to radial expansion of the supported member 22 or simply occur under vertical or lateral loading. Both the first arm 26 and second arm 28 also include snubbers 44 to allow a direct connection to the top member 34 such that when very large loads are encountered, the first spring 30, second spring 32, and third spring 36 are not over stressed or over strained. The snubbers 44 limit the motion of first arm 26 and likewise of second arm 28 relative to the top member 34. In other words, the snubbers 44 allow a selected amount of motion of first and second arms 26 and 28 before snubbing occurs. In addition, the snubbers 44 will limit the lateral and vertical movement of the supported member 22 relative to the supporting member 24. Each snubber 44 may include a layer of elastomer 45 preferably bonded to the snubber inner member 47 for cushioning any impact loading. The periphery of the layer of elastomer 45 contacts a pocket 49 formed within the first arm 26 and second arm 28. The snubbers 44 will define the sway space or deflection envelope allowable by the supported member 22.

Each of the first and second springs 30 and 32 of this embodiment are further comprised of laterally positioned elements 46 which extend generally vertically and vertically positioned elements 48 which extend generally laterally. The vertical elements 48 are critical elements in carrying the pivot loads resulting from vertical motion of the supported member 22, and the lateral elements 46 primarily determine the lateral stiffness of the mounting 20. These elements 46 and 48 are elastomeric in this embodiment, but could be made of any flexible material which can accommodate the stress, strain, and temperature for the desired application, such as metal mesh, natural rubber elastomer, synthetic elastomer, silicone elastomer or other suitable elastic materials. In addition, they could be of laminated shim-and-elastomer construction. The lateral elements 46 could be placed at other locations on the arms 26 and 28, as well, such as near, or incorporated in, the third spring 36. Further, the vertical elements 48 can be located anywhere along arms 26 and 28. On top of top member 34 are shear pilots 50 which are press fit into the recesses in the top member 34 and act to carry any shear loads which are transferred from supported member 22 to supporting member 24. The top member 34 is connected to supporting member 24 by high strength bolts (not shown), or the like. Furthermore, the supported member 22 is connected to the outboard ends 38 of first and second arms 26 and 28 by lugs 54 formed on the supported member 22. As opposed to other similar mountings, the present invention requires no links, since the two arms 26 and 28 easily move apart laterally if required by expansion of the supported member 22. Further, the mounting 20 does not require a separate hanger for attaching to, or connecting to, the supported member 22. In this particular embodiment, at least one of the arms 26 and 28 are further connected to the top member 34 by way of fastener 52, as will be described later. This embodiment optionally includes safety 56 which includes hole 57 and catcher rod 59 for catching the supported member 22 should one of the other connections be lost. The safety 56 has enough clearance to allow all normal motions of the supported member 22, relative to the supporting member 24, to occur.

By appropriate preferential selection of the spring rates for the first, second and third springs 30, 32 and 36 respectively, as detailed later, the first and second arms 26 and 28 can be made to have a maximum stiffness along the axis labeled A and a much lower stiffness along the axis labeled B. The effect of this is a focalization that projects the lateral elastic center of the mounting 20 downward such that the lateral elastic center substantially coincides with the location of the CG of the supported member 22. Lateral loads applied at the CG of the supported member 22 are thus reacted at that level and do not cause a torsional roll moment which would have otherwise caused unwanted roll rotation, or sway, of the supported member 22.

Figure 2:
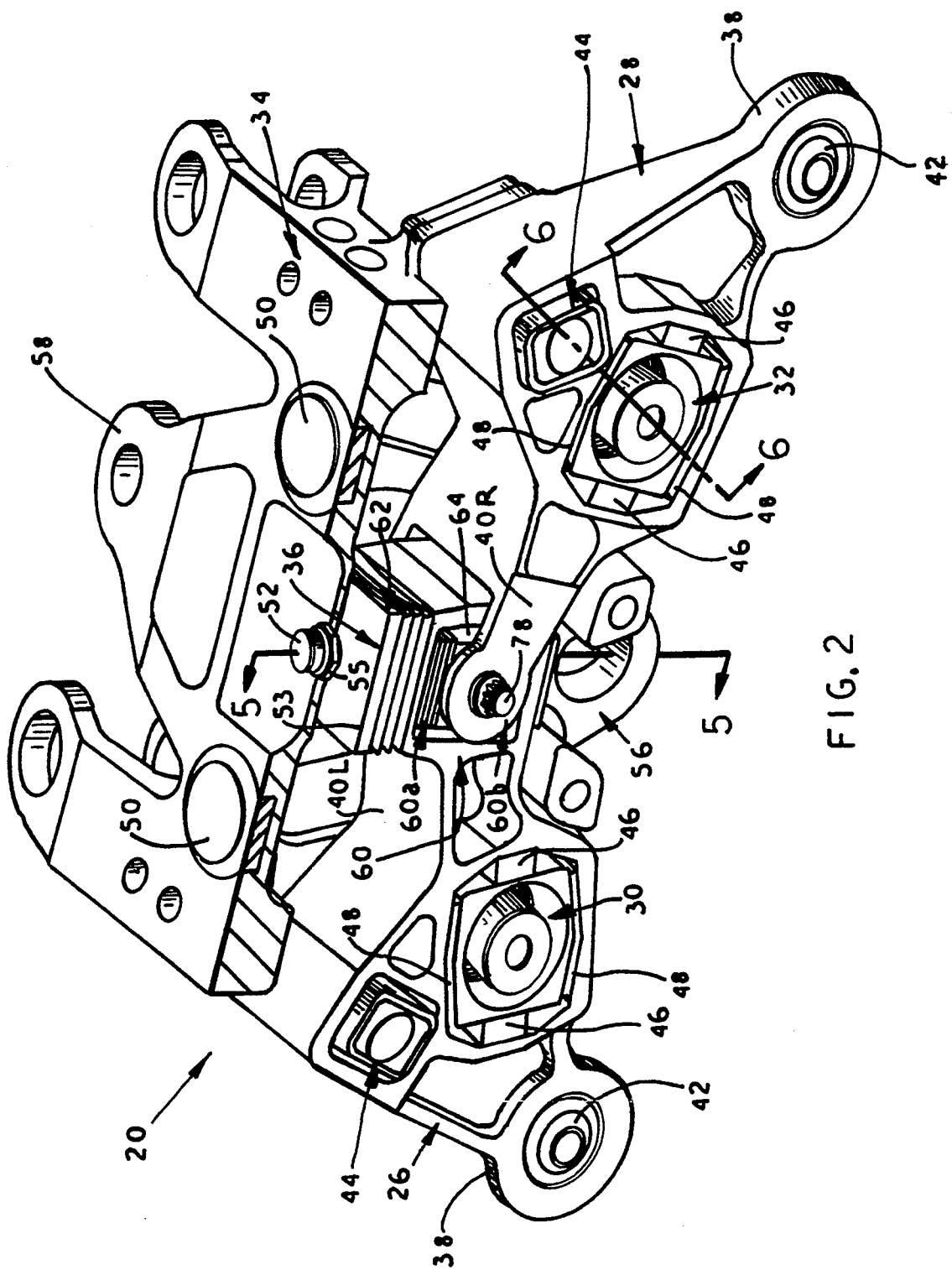
FIG. 2 is a partially-sectioned, forward-and-downward-looking isometric view of the mounting.

FIG. 2 illustrates another view of the present invention mounting 20. Shown in a more detailed fashion is third spring 36 which interconnects the first and second arms 26 and 28, preferably at a central location in the mounting 20, and also connects them to the top member 34.

Figure 3:
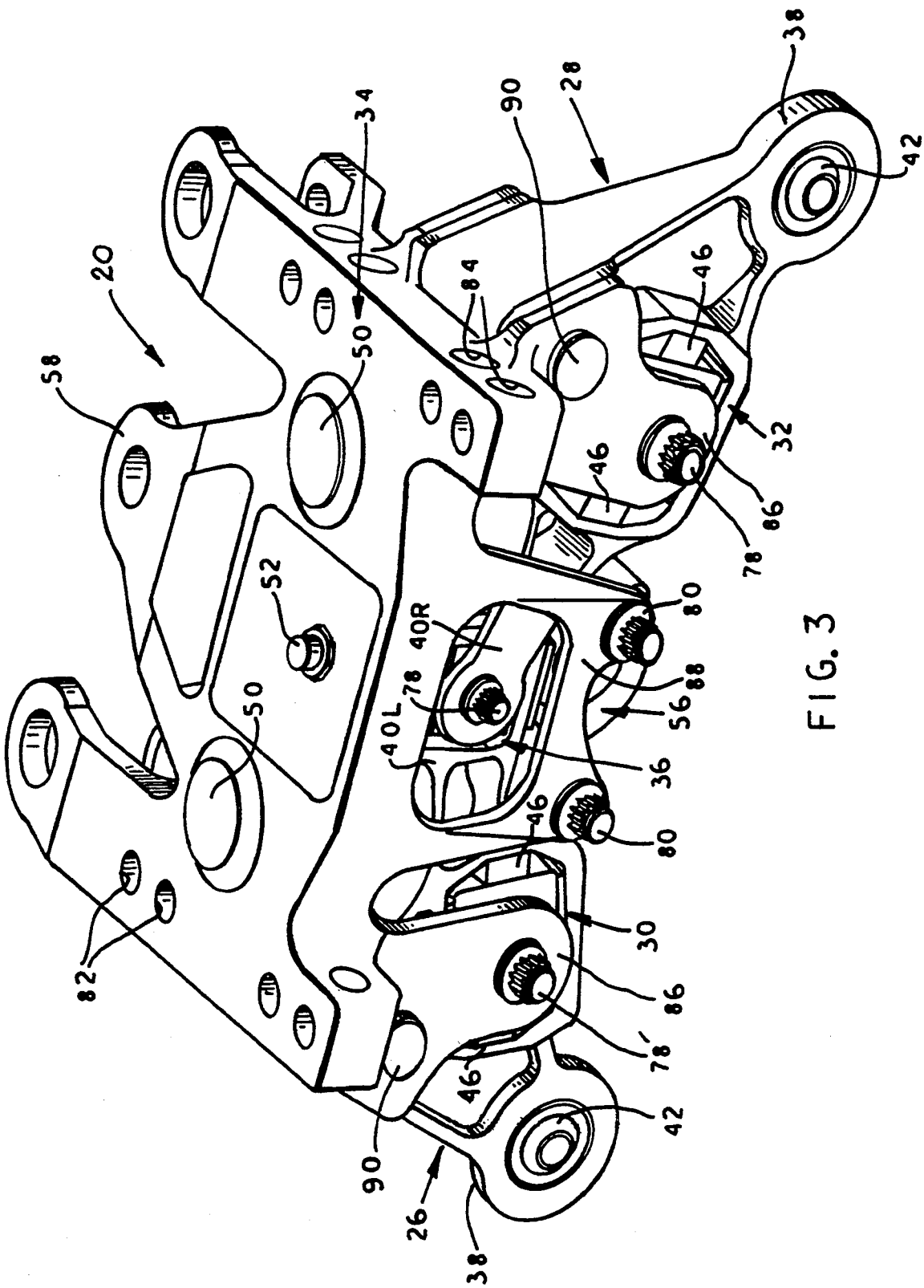
FIG. 3 is an forward-and-downward-looking isometric view of the mounting.

FIG. 3 illustrates another view of the mounting 20 wherein the thrust link attachment 58 is shown as part of the top member 34. The top member 34 is attached to the supporting member 24 (FIG. 1) by high strength bolts (not shown), which extend through four sets of first bores 82 and are secured by barrel nuts (not shown) which are inserted in four sets of second bores 84. Also shown are first clevises 86 for straddling arms 26 and 28, and second clevis 88 which attaches to a portion of safety 56 by way of fasteners 80.

Figure 4:
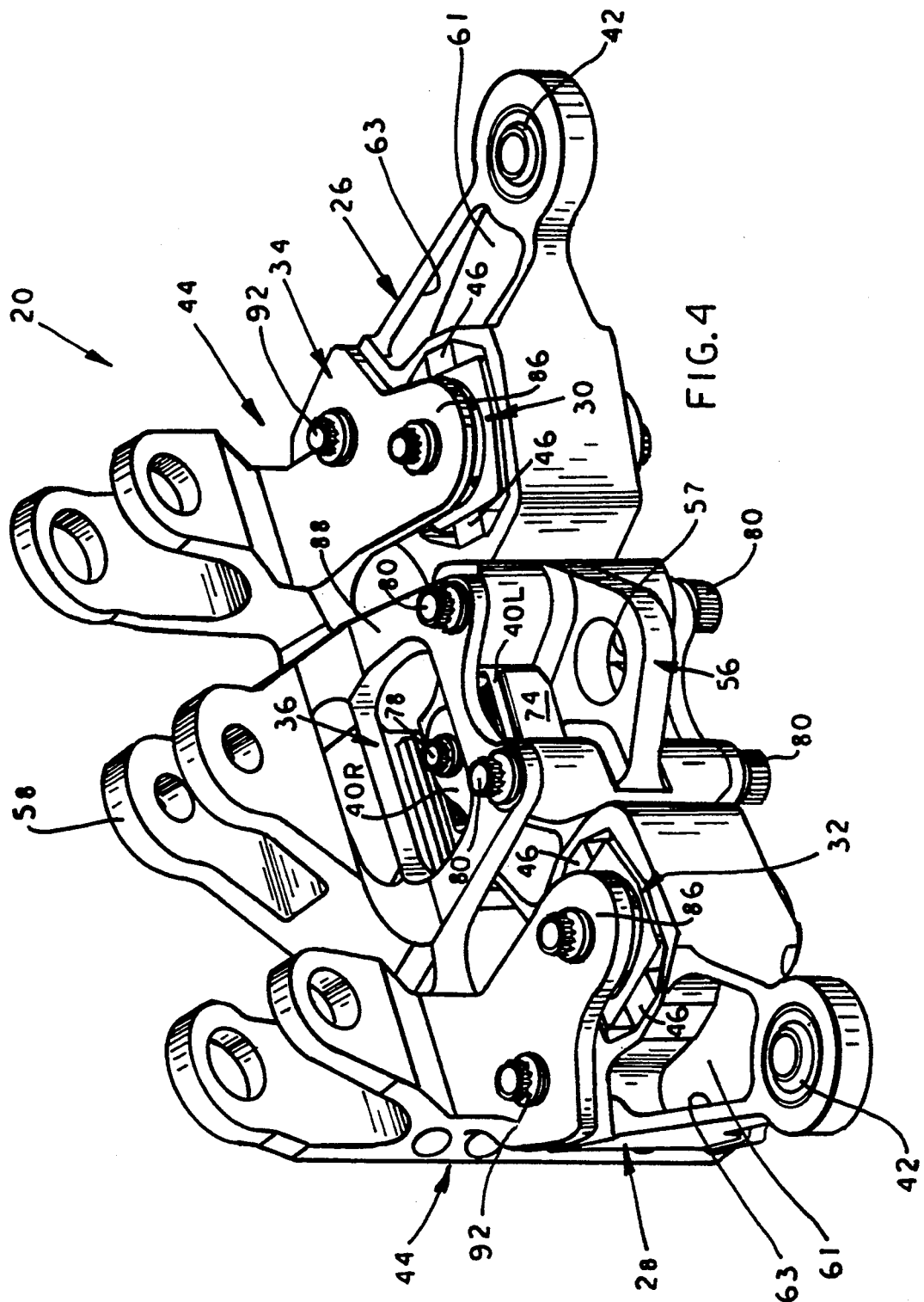
FIG. 4 is an upward-and-aft-looking isometric view of the mounting.

FIG. 4 illustrates yet another view of the mounting 20. The snubber 44 (which is hidden) is positioned and held in place by inner bolts 90 (FIG. 3) and outer bolts 92. Further, a bottom view of a portion of the safety 56 is shown. Clearly shown in this view are weight-reduction pockets 61 and ribs 63 which are used to strengthen arms 26 and 28.

Figure 5:
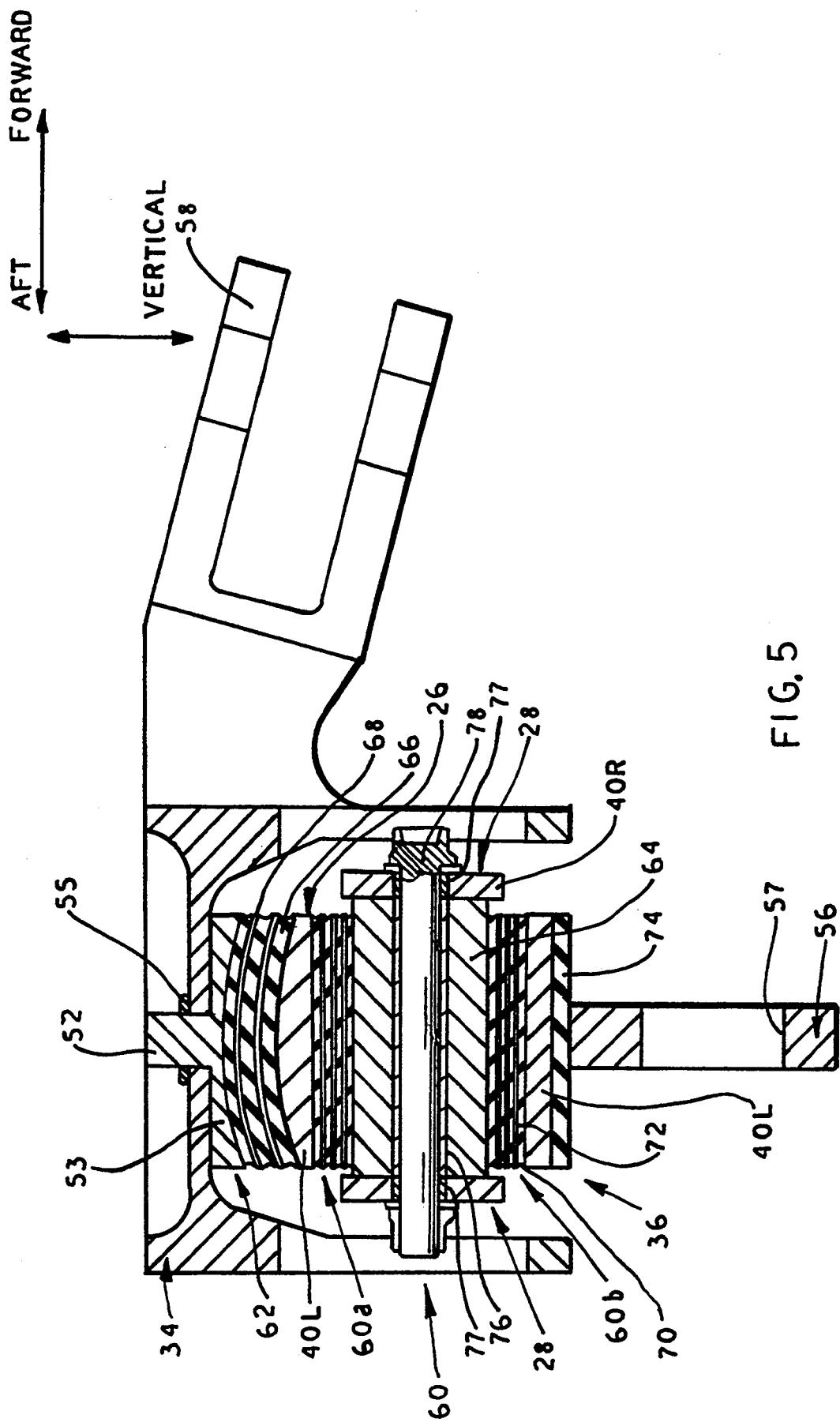
FIG. 5 is a partially-sectioned side view along line 5—5 of FIG. 2 including the third spring of the mounting.

In FIG. 5, the detailed construction of the third spring 36 is shown. The third spring 36 is comprised of a outer member 53 having a fastener 52 formed on its top surface. The outer member 53 is then secured to top member 34 by threading nut 55 onto fastener 52. The loads are reacted into the top member 34 and between the first and second arms 26 and 28, by the third spring 36. The third spring 36 further includes an inner member 64, first section 60 which is preferably an elastomeric spring and which includes upper portion 60a and lower portion 60b, and second section 62. This first section 60 attaches the first and second arms 26 and 28 together at their inboard ends 40L and 40R such that they are restrained vertically from relative movement. The inner member 64 is attached and secured by fastener 78, such as the high strength nut and bolt shown, between clevis of the inboard end 40R of the second arm 28.

The fastener 78 is inserted through the first bushing 76 and second bushings 77, and tightened such that rotation of the inner member 64 does not occur. The fastener 78 slip fits through first bushings 76 which are press fit into the inner member 64 and also through second bushing 77 which is press fitted into the clevis of the second arm 28. The first section 60 includes upper and lower portions 60a and 60b which are preferably elastomeric springs of laminated shim-and-elastomer construction and which are integrally bonded to the inboard end 40L and inner member 64, and include fiat elastomer layers 70 sandwiched between fiat shims 72, which are preferably metallic. Upper portion 60a and lower portion 60b preferably each have identical vertical stiffnesses of 360,000 lb/in. In the lateral and forward and aft directions, the shear stiffness of the upper portion 60a and lower portion 60b are each preferably 3,450 lb/in.

The second section 62 includes laminated shim-and-elastomer construction comprised of truncated cylindrical elastomer layers 66 and truncated cylindrical shims 68, which are preferably metallic. The second section 62 is integrally bonded to the inboard end 40L and the outer member 53. The external contour on the inboard end 40L of first arm 26 matches the curve on the truncated cylindrical layers 66. The vertical stiffness of the second section 62 is typically about 52,000 lb/in. Laterally (into and out of the paper), the stiffness is about 1,876 lb/in., while in the fore and aft direction (tangential to the cylindrical surfaces), the shear stiffness during cocking is, similarly, about 1,876 lb/in. This low cocking stiffness of the second section 62 allows for the supported member 22 (FIG. 1) to move easily in the forward and aft direction, such as to accommodate expansion along the longitudinal axis of the supported member 22.

In this embodiment, the first section 60 of the third spring 36 allows the inboard ends 40L and 40R of arms 26 and 28 to move laterally relative to each other because of their relatively low lateral stiffness, but are restrained by the relatively high spring rate from vertical relative motion at their inboard ends 40L and 40R. Typically, the stiffness of the first section 60 is preferably at least about 7 times stiffer than the second section 62 in compression in the vertical direction, but anywhere in the range from 1 to 1000 times stiffer would provide a similar kinematic result, depending on the location of the springs 30, 32, and 36. This gives the mounting 20 a low vertical spring rate when both outboard ends 38 of arms 26 and 28 are moving downward, and while compressing second section 62 upward. However, when the outboard ends 38 move vertically in opposite directions (one upward and one downward), the high compression stiffness of the first section 60 limits the motion by providing a roll stiffness of about 83,000,000 in.-lb./rad. Further, a portion of safety 56 is shown for supporting the supported member 22 by means of catcher rod 59 (FIG. 1) in hole 57 should the connection at an end 38 of either arm 26 or 28 be lost bringing catcher rod 59 (FIG. 1) and hole 57 into contact. To control up loads, a pad 74, which is preferably elastomeric and rectangular in shape, is added to the bottom section of the first arm 26.

Figure 6:
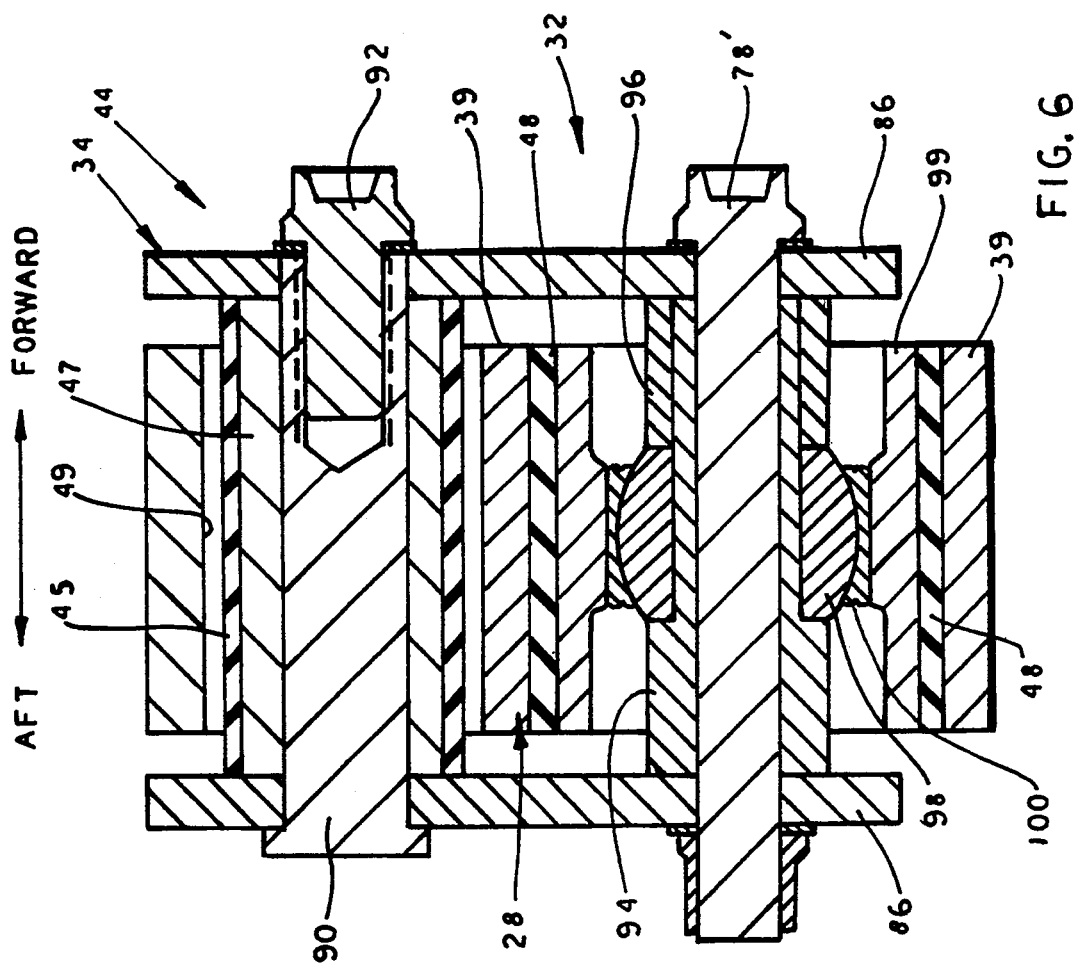
FIG. 6 is a cross-sectional side view along line 6—6 of FIG. 2 including the first spring and snubber of the mounting.

FIG. 6 shows a section of the second spring 32 and the snubber 44 in detail. The snubber 44 is comprised of a snubber inner member 47 and a layer of elastomer 45 which acts to cushion the loading of the snubber 44. The layer of elastomer 45 will contact pocket 49 formed in second arm 28 upon reaching the limit of motion. The snubber 44 is secured in place between flanges of first clevis 86 of top member 34 of each of the arms 26 and 28 by inner and outer bolts 90 and 92. The second spring 32 is constructed of a first sleeve 94 and second sleeve 96, a ball 98, a race 100, and an inner member 99, all of which is secured together by nut and bolt fastener 78°. The ball 98 is squeezed by the first and second sleeves 94 and 96 such that it does not rotate in torsion. The race 100 is staked onto inner member 99 such that the ball 98 and the race 100 are free to pivot and rotate relative to one another, thus allowing arms 26 and 28 to rotate as necessary and pivot due to forward and aft movement of the supported member 22. In essence, the second spring 32 acts as a means for allowing pivoting of second arm 28 and likewise, first spring 30 acts as a means for allowing pivoting of first arm 26. The vertical element 48 is preferably chevron shaped (as shown in FIG. 1) to provide the appropriate lateral restraint. Preferably, the vertical elements 48 and likewise the lateral elements 46 (FIG. 1) are integrally bonded to the central portion 39 of first arm 26 and second arm 28, as well as to the inner member 99.

Figure 7:
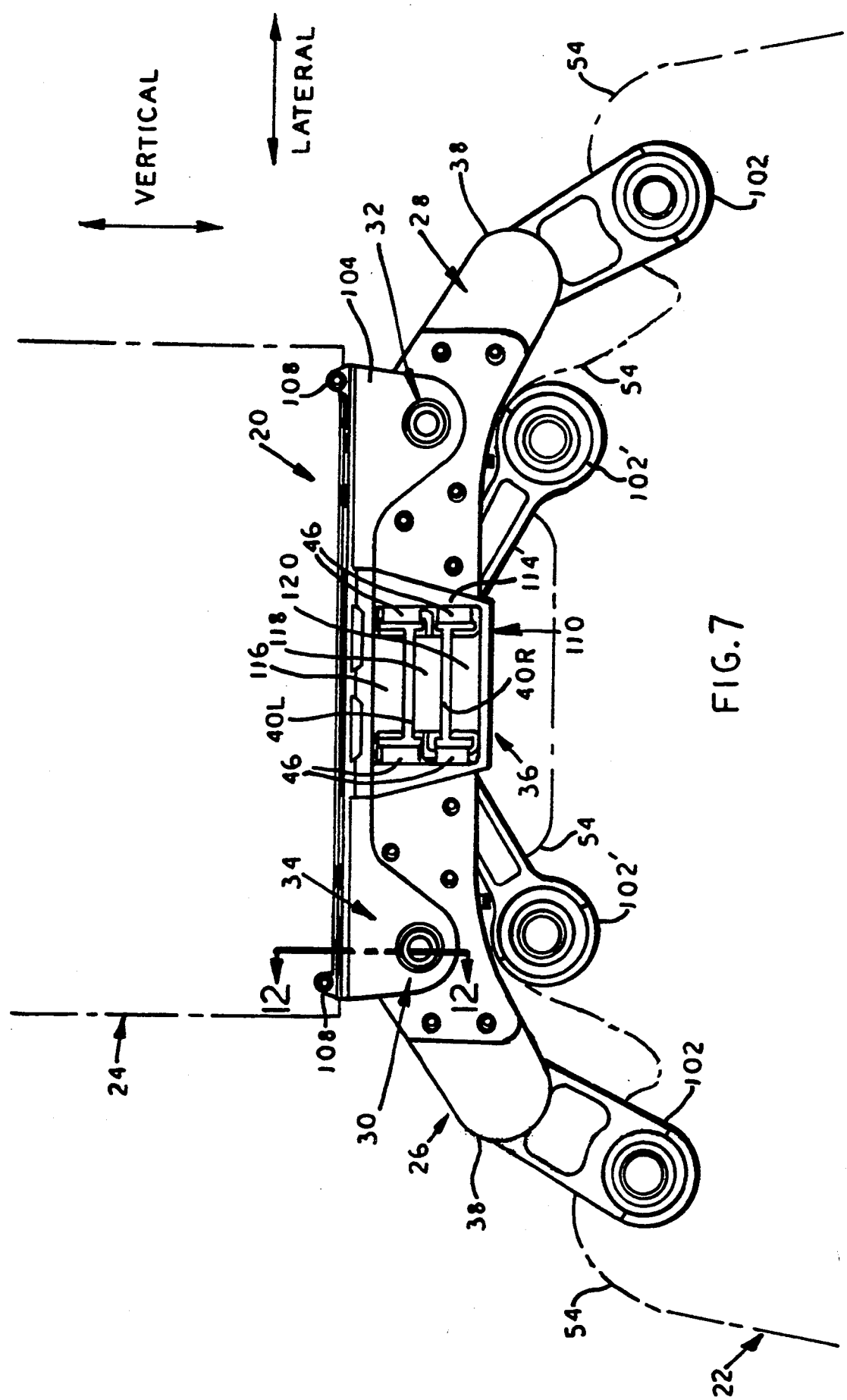
FIG. 7 is an aft-looking view of another embodiment of the mounting.

FIG. 7 illustrates another embodiment of the mounting 20 wherein like numerals denote like members. This embodiment of mounting 20 also includes first and second arms 26 and 28, and top member 34 for attaching to the supporting member 24 (shown in dotted lines). The top member 34 in this embodiment is of two piece construction for damage tolerant purposes and includes a forward half 104 and an aft half 106 (FIG. 8) which are attached together by fasteners 108, such as high strength bolts or the like. The mounting 20 has two intermediate members which interconnect the supported member 22 to the outboard ends 38 of arms 26 and 28, such as two links 102. Two links 102' (which were not used in the previous embodiment) attach to the lugs 54 of the supported member 22 (shown in dotted lines) and near the inboard end 40L and 40R of first and second arms 26 and 28. Each of the links 102 and 102' preferably has a spherical ball joint at each end for accommodating pivoting and, among other things, radial and forward-and-aft expansion of the supported member 22. The first and second springs 30 and 82, which are hidden and recessed within the first and second arms 26 and 28, are used as pivots in a similar manner as in the previous embodiment.

Figure 8:
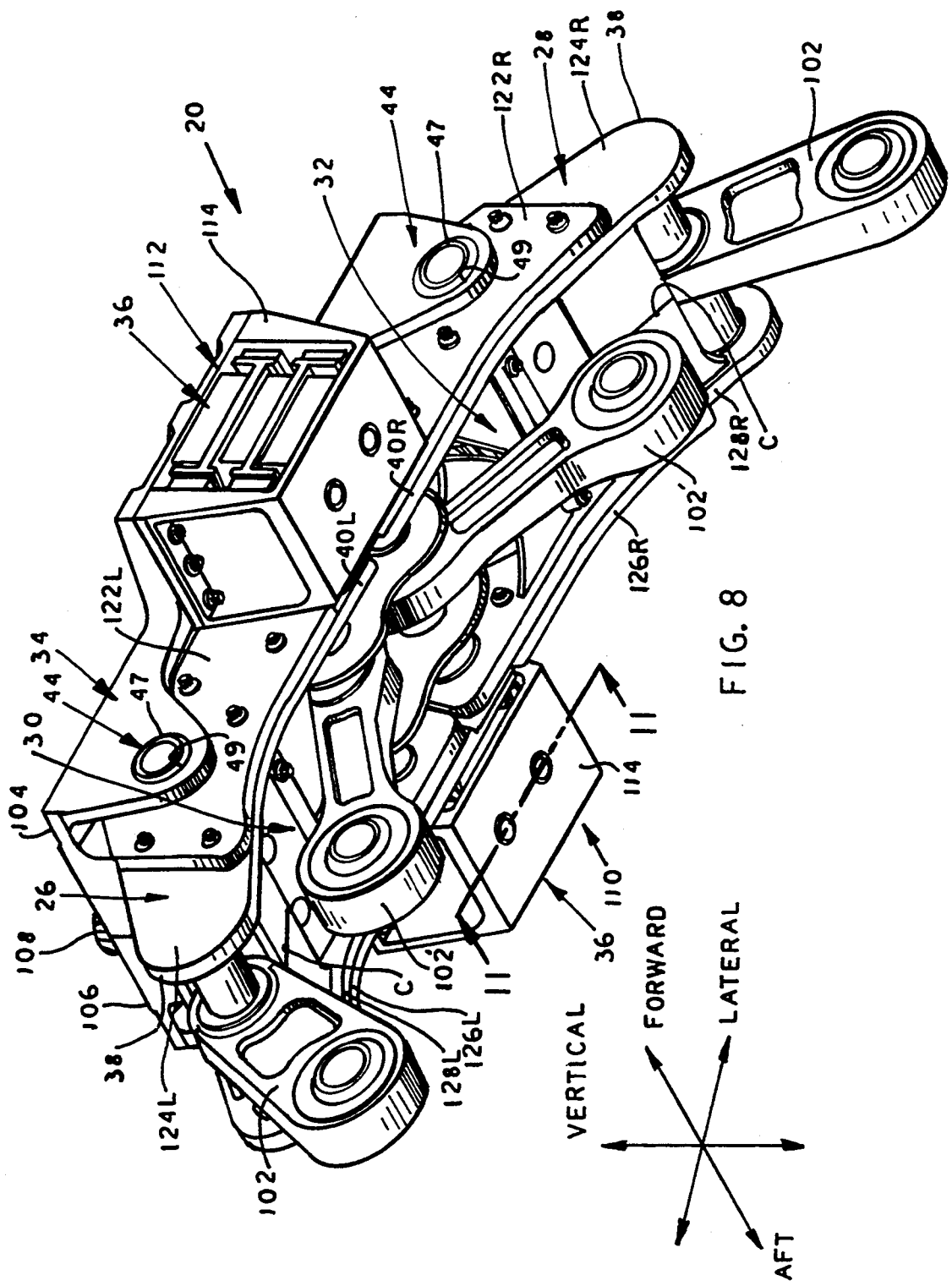
FIG. 8 is an aft-and-upward-looking isometric view of the mounting.

As shown in FIG. 8, the third spring 36 in this embodiment is comprised of spaced-apart forward portions 110 and aft portions 112, in place of the single centralized element used for the third spring 36 of the previous embodiment (FIG. 6). The forward and aft portions 110 and 112 utilize caps 114 which attach to top member 34 and vertically compress the third spring 86. As seen in FIG. 7, each of the forward and aft portions 110 and 112 of the third spring 36 further include a top portion 116, an intermediate portion 118, a lower portion 120, and lateral elements 46. These portions and elements will be described in more detail later.

Referring again to FIG. 8, each of the arms 26 and 28 are of multiple piece construction for fail-safe and damage tolerant considerations. The arms 26 and 28 include bolted-together forward outer plates 122L and 122R and forward inner plates 124L and 124R, as well as bolted-together aft outer plates 126L and 126R and aft inner plates 128L and 128R. Each half of the arms 26 and 28 are secured to one another at line C and connected together by fasteners such as key ways and bolts (not shown). The additional inner links 102' of this embodiment add a safety element such that if any one of the links 102 or 102' is lost, the others will support the load. Like the previous embodiment, this embodiment also has a snubber 44, which includes inner member 47 and pocket 49, whereby excessive loads or motions will cause the inner member 47 to snub in pocket 49.

Figure 9:
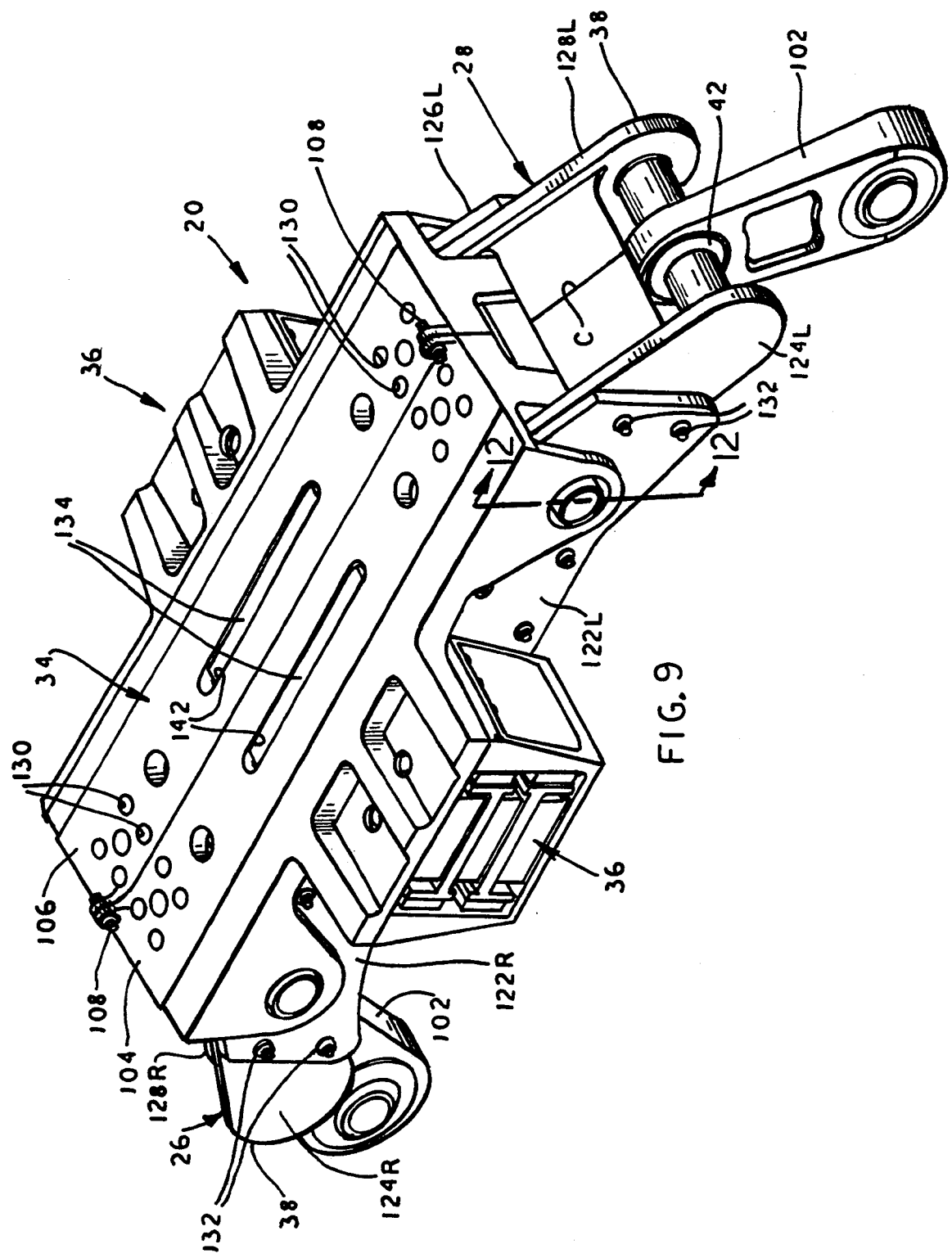
FIG. 9 is an forward-and-downward-looking view of the mounting.

FIG. 9 illustrates another view of this embodiment of mounting 20. In this view, the two piece construction of both the top member 34 and first and second arms 26 and 28, is illustrated. The top member 34 includes first half 104 and second half 106. Also shown is the assembly of the links 102 into the outboard end 38 of second arm 28, and the pivot 42 at the end of link 102. The forward outer plates 122L and 122R and forward inner plates 124L and 124R which make up one half of arms 26 and 28 are shown attached together by way of fasteners 132, such as bolts, but may include key ways to limit shear loading of the fasteners 132. Again, halves of arm 28 are fastened together along line C by suitable means such as bolts and key ways (not shown). Also shown are some of the weight-reduction or lightening pockets 130 formed in the top member 34 and portions of safety lugs 134 extending into pockets 142, which will be described later.

Figure 10:
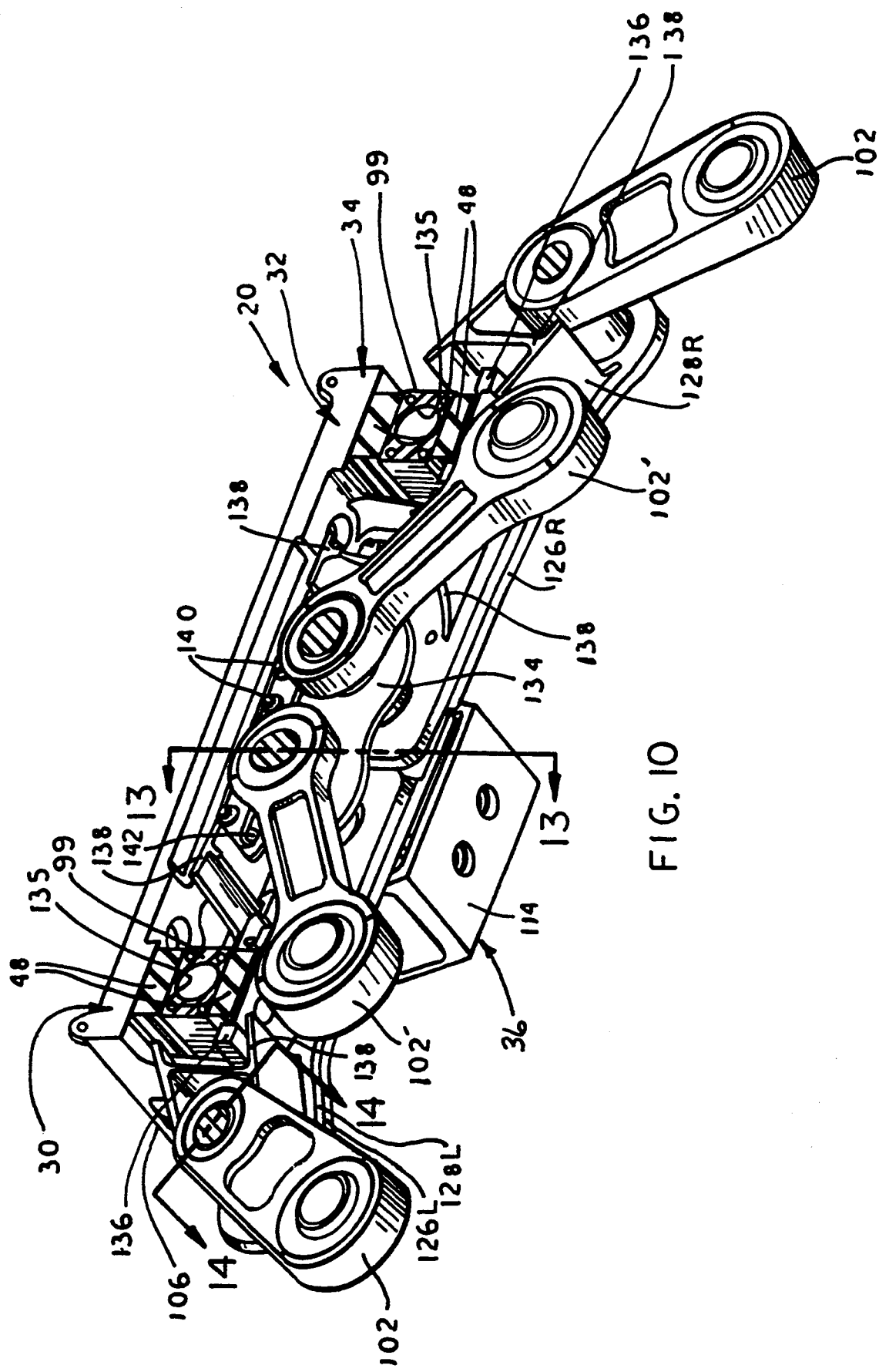
FIG. 10 is a partially-sectioned isometric view of the mounting, with the forward half removed, showing the first and second springs.

FIG. 10 illustrates this embodiment of mounting 20 in cross section. Clearly shown are the construction details of the first and second spring 30 and 32, the connection of inner links 102', and the safety lugs 134. The first and second springs 30 and 32 are further comprised of inner member 99 having an inner member bore 135 therethrough. Further, first and second springs 30 and 32 include cap 136 for retaining and compressing the vertical elements 48. Cap 136 is fastened by way of spacers and bolts (not shown) to top member 34, thus providing support to the cap 136 and providing the appropriate amount of precompression to vertical elements 48. Each of the vertical elements 48 in this embodiment includes laminated shim-and-elastomer construction. However, the lateral elements 46 used in conjunction with earlier embodiments are omitted from this embodiment. Instead, the function of these lateral elements are incorporated into the third spring 36. Ribs 138 add strength to aft inner plates 128L and 128R. Bolts 140 attach safety lugs 134 into pocket 142 formed in top member 34.

The third spring 36 of this embodiment of mounting 20 is shown in FIG. 11. Clearly shown are the construction details of the third spring 36. The third spring 36 includes lateral elements 46, top portion 116, intermediate portion 118, and bottom portion 120. Each of these portions 116, 118, and 120 include a top plate 144, and a bottom plate 146. Each of plates 144 and 146 have pilots 148 formed on them for interacting with bores 150 formed in top member 34, caps 114, outer plates (not shown) and outer plates 122L and 122R, and top member 34. The top and bottom plates 144 and 146 have the elastomer sections 152 integrally bonded thereto. These elastomer sections 152 are preferably of laminated shim-and-elastomer construction. Multiple pilots 148 restrain rotation and translation of the top and bottom plates 144 and 146 relative to the caps 114, top member 34, and outer plates 122 and 126. The cap 114, when urged against top member 34 by bolts 154, will position and compress the elastomer sections 152. The preferred static spring rates of the top portion 116 are 40,000 lb/in. in compression and 2,000 lb/in. in shear for each of the forward (110) and aft (112) portions of third spring 36. The lower portion 120 is identical to the top portion 116. The intermediate portion 118 has a preferable static spring rate of 40,000 lb/in. in compression and 2,000 lb/in. in shear also for each of the forward and aft portions. Together, as a unit, the assembly functions to limit movement of arms 26 and 28 relative to one another, yet allows vertical movement of arms 26 and 28 relative to top member 34. Each lateral element 46 exhibits a spring rate of 18,750 lb/in. in compression.

FIG. 12 shows a more detailed view of the first spring 30 of this embodiment which is identical to the second spring 32 and, therefore, this detailed description of the spring 30 will suffice to describe both. Snubber inner member 47, which is preferably hollow and pin-like, is inserted through inner member bore 135 formed in inner member 99 and locked from rotation and translation relative to inner member 99 by suitable locking means, such as set screws, keyways or the like (not shown). Further, inner member 47, is inserted through bushings 156 to provide the connection between the first spring 30 and the first arm 26, and similarly, between the second arm 28 and the second spring 32. The first spring 30 is of similar construction to the third spring 36 (FIG. 9) and includes a top plate 158 with pilots 160 formed thereon. It is also of shim-and-elastomer construction including shims 162 and elastomer 164. The top plate 158, when urged against top member 34 by bolts (not shown), will position and precompress the first spring 30. The preferred static spring rates of first spring 30 are 93,100 lb/in. in compression and 4,000 lb/in. in shear. The first (30) and the second (32) springs function to limit movement of, and provide a pivot point for, arms 26 and 28, as well as provide a portion of the composite lateral and vertical stiffness of the mount.

FIG. 13 clearly illustrates the construction details in proximity of the third spring 36. The link 102' attaches to pin 166 and is held in place by spacer 168 and shoulder 170 on pin 166. Further, ends of pin 166 and of spacer 168 are inserted in bushings 172 which are press fit into the forward inner plates 124L and aft inner plates 128L. Race 100 and ball 98 serve as a spherical ball joint in the same manner as on link 102 (FIG. 10). The section shown passes through the flanges on aft outer plates 126L and 126R and forward outer plates 122L and 122R to show that further snubbing can occur between top member 34 and forward and aft outer plates 122R and 126R and between forward and aft outer plates 122L and 126L and cap 114. Clearly shown are safety lugs 134 which are inserted in pockets 142 and secured by bolts 140. This snubber 44 limits the movement of link 102' relative to top member 34.

FIG. 14 clearly illustrates the construction details at the link 102 attachment points. The link 102 attaches to pin 166 and is held in place by spacer 168 and shoulder 170 on pin 166. Further, ends of pin 166 and sleeve 168 are inserted in bushings 172 which are press fit into the forward inner plate 124L and aft inner plate 128L. Ball 98 and race 100 serve as a spherical ball joint to allow rotation and pivoting of links 102. Similarly, the right side construction is identical to the left side construction.

While several embodiments of the present invention have been described in detail, various modifications, alterations, changes and adaptations to the aforementioned may be made without departing from the spirit and scope of the present invention defined in the appended claims. Modifications may include moving the location of the snubbers 44, having the third spring 36 located other than at the inboard ends of arms 26 and 28, and moving the second portion of the third spring 36 to another portion of the arms 26 and 28. Further, first section 60 and second section 62 of the third spring 36 could be at separate locations. It is intended that all such modifications, alterations and changes be considered part of the present invention.

What is claimed is:

1. A mounting for attaching a supported member to a supporting member, comprising:
   (a) a top member for attachment to said supporting member,
   (b) a first arm having an outboard end, an intermediate member interconnecting said outboard end to said supported member, an inboard end spaced apart from said outboard end, and a central portion extending between said outboard and said inboard ends;
   (c) a second arm having an outboard end, an intermediate member interconnecting said outboard end to said supported member, an inboard end spaced apart from said outboard end, and a central portion extending between said outboard and said inboard ends;
   (d) a first spring attached to said central portion of said first arm for allowing pivoting and reacting loads into said top member and for connecting said first arm to said top member;
   (e) a second spring attached to said central portion of said second arm for allowing pivoting and reacting loads into said top member and for connecting said second arm to said top member; and
   (f) a third spring attached near said inboard ends of said first and said second arms for reacting loads into said top member and for connecting inboard ends of said first and said second arms to said top member and for reacting loads between said first and said second arms.

2. A mounting according to claim 1 wherein said first spring further includes a forward portion and an aft portion.

3. A mounting according to claim 1 wherein said first arm, said second arm, and said top member are of two piece construction.

4. A mounting according to claim 1 wherein said first arm and said second arm include links attached near their said inboard ends.

5. A mounting according to claim 1 wherein said first spring, said second spring and said third spring includes caps for precompressing said first, second, and third springs.

6. A mounting for attaching a supported member to a supporting member, comprising:
   (a) a top member for attachment to said supporting member,
   (b) a first arm having an outboard end adapted for attaching to said supported member, an inboard end spaced apart from said outboard end, and a central portion extending between said outboard and said inboard ends;
   (c) a second arm having an outboard end adapted for attaching to said supported member, an inboard end spaced apart from said outboard end, and a central portion extending between said outboard and said inboard ends;
   (d) a first spring attached to said central portion of said first arm and formed for reacting loads into said top member and for connecting said first arm to said top member;
   (e) a second spring attached to said central portion of said second arm and formed for reacting loads into said top member and for connecting said second arm to said top member; and
   (f) a third spring attached to said inboard ends of said first and said second arms for reacting loads into said top member and for connecting said inboard ends of said first and said second arms to said top member and for reacting loads between said first and said second arms.

7. A mounting according to claim 1 wherein said third spring further includes an elastomeric spring which attaches said first and said second arms together at their said inboard ends.

8. A mounting according to claim 1 wherein said third spring further includes a first section and a second section which are both elastomeric springs.

9. A mounting according to claim 8 wherein said first section is at least three times as stiff as said second section.

10. A mounting according to claim 8 wherein said first section of said third spring further includes a first portion and a second portion which are both of laminated shim-and-elastomer construction and of equal vertical stiffness.

11. A mounting according to claim 1 which further includes a snubber to limit the motion of said first and said second arms relative to said top member.

12. A mounting according to claim 1 wherein said first spring and said second spring further include lateral elements and vertical elements.

13. A mounting according to claim 1 wherein said first spring further includes vertical elements which have a chevron shape.

14. A mounting according to claim 1 wherein a lateral elastic center of said mounting is focalized such that the elastic center of said mounting is substantially coincident with the center of gravity location of said supported member.

15. A mounting for attaching a supported member to a supporting member, comprising:
   (a) a top member for attachment to said supporting member,
   (b) a first arm extending in a first direction including means for allowing pivoting of said first arm relative to said top member about a first pivot axis located at a central portion of said first arm and including means for connecting said first arm to said supported member;
   (c) a second arm extending in a second direction substantially opposite of said first arm including means for allowing pivoting of said second arm relative to said top member about a second pivot axis located at a central portion of said second arm, said second pivot axis being spaced apart from, and non-coincident with, said first arm and also including means for connecting said second arm to said supported member;

(d) spring means attaching said first arm and said second arm to each other and connecting said first and said second arms to said top member such that said first arm and said second arm are restrained from relative vertical movement where said first arm attaches to said second arm.

16. A mounting according to claim 15 which further includes a snubber to limit the motion of said first arm and said second arm relative to said top member.

17. A mounting according to claim 15 wherein said means for allowing pivoting includes a spring.

18. A mounting according to claim 15 wherein said spring means includes a first section which attaches said first arm to said second arm and a second section which attaches one of said first and said second arms to said top member.

19. A mounting according to claim 15 wherein said spring means are elastomeric.

20. A mounting according to claim 15 wherein said means for connecting to said supported member includes a ball joint.

* * * * *

UNITED STATES PATENT AND TRADEMARK OFFICE
CERTIFICATE OF CORRECTION

PATENT NO. : 5,351,930
DATED : October 4, 1994
INVENTOR(S) : John J. Gwinn et al.

It is certified that error appears in the above-indentified patent and that said Letters Patent is hereby corrected as shown below:

IN THE ABSTRACT

Line 23, replace "localiz-" with --focaliz- --

Col. 2, line 63, replace "localized" with --focalized--; line 65, replace "(CO)", with --(CG)--.

Col. 7, line 21, replace "fiat" with --flat--; line 22, replace "fiat" with --flat--.

Col. 8, line 17, replace "78°", with --78'--; line 55, replace "82" with --32--; line 63, replace "(FIG. 6)" with --(FIG. 5)--; line 65, replace "86" with --36--.

Col. 10, line 46, replace "dearly" with --clearly--.

Col. 11, line 65, Claim 6, line 3, after "member", insert --adapted--.

Col. 12, line 23, Claim 7, line 1, replace "according to claim 1", with --according to claim 6--.

Col. 12, line 27, Claim 8, line 1, replace "according to claim 1", with --according to claim 6--.

Col. 12, line 38, Claim 11, line 1, replace "according to claim 1", with --according to claim 6--.

Col. 12, line 41, Claim 12, line 1, replace "according to claim 1", with --according to claim 6--.

Col. 12, line 44, Claim 13, line 1, replace "according to claim 1", with --according to claim 6--.

Col. 12, line 47, Claim 14, line 1, replace "according to claim 1", with --according to claim 6--.

Signed and Sealed this

Sixth Day of December, 1994

Attest:

BRUCE LEHMAN

*Attesting Officer*   *Commissioner of Patents and Trademarks*